S. D. Arnold,
Shutter Fastener.

No. 105,409.   Patented July 19, 1870.

Witnesses:
Geo. D. Walker
Chas. H. Smith

Stephen D. Arnold
Lemuel W. Serrell
att'y

United States Patent Office.

STEPHEN D. ARNOLD, OF NEW BRITAIN, CONNECTICUT, ASSIGNOR TO P. & F. CORBIN, OF SAME PLACE.

Letters Patent No. 105,409, dated July 19, 1870.

IMPROVEMENT IN SHUTTER-FASTENING.

The Schedule referred to in these Letters Patent and making part of the same

*To all whom it may concern:*

Be it known that I, STEPHEN D. ARNOLD, of New Britain, in the county of Hartford and State of Connecticut, have invented and made a new and useful Improvement in Fastenings for Shutters, &c.; and the following is declared to be a correct description thereof.

The fastenings that have heretofore been made for inside shutters and blinds have generally contained a hook-ended bar, swinging upon a pivot or screw, and taking into a loop that is screwed to the opposite shutter. Ordinary hooks with screw-eyes are also common for fastenings of blinds.

In almost all fastenings of this character, the two ends of the hook are different in appearance, and are not adapted to being attached so as to swing with the pivot at either the right or the left-hand end.

My invention is made with reference to having both ends of the fastening of the same external shape and appearance, and allowing the hook to be pivoted upon either the right or left-hand shutter, and the loop attached to the opposite shutter or blind, thus greatly facilitating the use of these fastenings and improving their appearance.

In the drawing—

Figure 4:

Figure 4, a plan of the loop-plate for the stud of the hook-bar.

Figure 1:
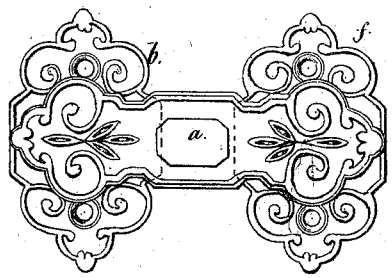
Figure 1 is an elevation of the said fastening complete.
Figure 2:
Figure 2 is a plan of the hook and its pivot-plate, the latter being in section.
Figure 3:
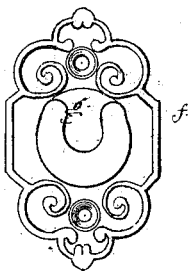
Figure 3 is an elevation.

The hook-bar $a$ is united to the pivot-plate $b$ by a rivet or screw, $c$. I prefer that a pin should be cast upon the back of the bar $a$, to form a rivet, as seen in fig. 2, and, by having a projecting boss in the middle of the plate $b$ for the pivot $c$, the hook-bar $a$ will be kept out from the surface of the shutter.

The hook-bar $a$ has the stud $d$ upon the back of its swinging end, and said stud may be cast upon such hook or attached to the same.

In consequence of the stud $d$, that forms the hook, being at the back of the bar $a$, the said bar $a$ can be made of any desired ornamental shape or configuration, and both ends alike.

The loop for the hook-stud $d$ is made of a plate, $f$, with a notched socket, $g$, for receiving the head and body of the stud $d$, and thereby making a firm connection when the stud $d$ is hooked thereinto.

The pivot-plate $b$ and loop-plate $f$ are to be attached to the respective shutters by screws, or otherwise, and the pivot-plate $b$ may be placed on either the right or left shutter or blind.

The swinging bar $a$ may have a projection upon the back around the pivot $c$, and the pivot-plate $b$ in that case may be flat.

The connecting button and socket being between the swinging end of the bar $a$ and the plate $f$, the parts are covered by the end of said bar, and the plate $f$ only requires to be screwed to the shutter instead of a mortise being cut into the wood, and, at the same time, the bar $a$ is a sufficient distance from the surface of the shutter to allow it to be moved with facility.

I claim as my invention—

The socket $g$ and stud $d$, between the bar $a$ and plate $f$, for connecting said bar $a$ and plate $f$, in combination with the plate $b$ upon which the bar $a$ swings, the parts being constructed so that the attaching plate $b$ and $f$ will be in line with each other, and the bar $a$ stand out from the shutter, as and for the purposes specified.

Signed by me this 2d day of April, A. D. 1870.

S. D. ARNOLD.

Witnesses:
CHARLES PECK,
WILLIS G. LAMB.